Feb. 20, 1962 J. R. DAVEY 3,022,375

SYNCHRONIZING START-STOP DIGITAL TRANSMISSION SYSTEM

Filed Sept. 22, 1955 3 Sheets-Sheet 1

INVENTOR
J. R. DAVEY
BY John E. Cassidy
ATTORNEY

INVENTOR
J. R. DAVEY
BY
John E. Cassidy
ATTORNEY

Feb. 20, 1962 J. R. DAVEY 3,022,375

SYNCHRONIZING START-STOP DIGITAL TRANSMISSION SYSTEM

Filed Sept. 22, 1955 3 Sheets-Sheet 3

INVENTOR
J. R. DAVEY
BY
John E. Cassidy
ATTORNEY

United States Patent Office 3,022,375

Patented Feb. 20, 1962

3,022,375
SYNCHRONIZING START-STOP DIGITAL TRANSMISSION SYSTEM

James R. Davey, Franklin Township, Somerset County, N.J., assignor to Bell Telephone Laboratories, Incorporated, New York, N.Y., a corporation of New York Filed Sept. 22, 1955, Ser. No. 535,824
10 Claims. (Cl. 178—53.1)

This invention relates to the maintenance of isochronism in the operation of telegraph systems which operate on a start-stop basis.

An object of the invention is the improvement in isochronism of start-stop telegraph circuits.

By start-stop operation in telegraphy is meant the transmission and reception of signal trains characterized in that each train has at its beginning a distinctive signal arrangement which indicates the start of a new train, marks the location of the first information bearing element and indicates the proper phasing of the signal element sensing function. In addition if the signal trains are not of equal length the train must terminate with a distinctive arrangement indicating to the receiver that it should stop and await the next train. An example of a start-stop signal system is the multielement two-condition start-stop permutation code signal system widely used in teletypewriter service in the United States. In this system each train of signals comprises seven elements. The first is a start signal element and is always a spacing signal element. The start signal element is followed by five signal elements, each of which may be either marking or spacing, all of equal duration, which convey the intelligence, and the last signal element of the train, which follows the intelligence bearing elements, is the stop signal element which is always a marking signal element. The start element and the five information elements are normally of equal duration. The marking stop condition continues between successive trains and its duration depends on the rate at which the trains are transmited. It normally has a minimum length of 1.4 elements. For the marking condition current is normally transmitted and received by the teletypewriters in the system. The first element of a signal train is always the spacing start element. For this condition the current transmited and received by the teletypewriters is interrupted. The receiving device is normally in the marking or current condition when idle and during the stop interval between the reception of successive trains. Upon the reception of the start signal which is a spacing or no current condition, it is set into operation. It is maintained in operation for an interval equal in duration to the duration of a single signal train under control of a motor or an oscillator which operates at substantially the same rate as that of the motor or oscillator which controls the signal transmitter. At the end of this interval the receiver is stopped automatically. During the interval while the receiver is in operation, and at proper times in its cycle, it senses the received signal elements. While the transmitter is transmitting trains in sequence, without interruption, the receiver will be arrested for a short interval during each stop element before starting on a new cycle, in response to the reception of the start element of the following train. In order to permit this, the receiver must attain the start position in which it is arrested during the stop interval long enough before the end of the duration of the stop inerval to compensate for any variation in the durations of the trains as received.

It should be apparent from the foregoing that each train of signals as received in independent of prior trains. Variations in the times of reception of trains cannot accumulate. Each train, at the start of its reception, starts a new cycle of operation of the receiver of a duration substantially equal to the duration of a standard train during which the intelligence bearing signal elements may be sensed at the proper times with substantially small possibility of error caused by sensing for a signal element at an improper time, since the sensing is performed at predetermined intervals during a single cycle of substantially standard duration.

It should be apparent from the foregoing also that the proper operation of the start-stop system is dependent on the recognition of the start element by the receiver. When the receiver is in the stop condition it will be set into operation for an interval equal to the duration of one train not only by a proper start signal element but by any signal which simulates a start signal element, unless it is provided with some means of protection against spurious start signal elements. When the system is arranged as described in the foregoing in which a stop signal element is a current condition and a start signal element is a no current condition, any interruption of current will start the receiver through a cycle, whether it be a bona fide start signal or a momentary interruption caused by some abnormal condition. It is not unusual, when such an abnormal condition occurs during continuous transmission and reception, for the receiver to continue to run erroneously for a number of trains, because upon completion of an erroneous cycle, the receiver may be restarted by any spacing signal element among the intelligence bearing signal elements, should, as a result of the previous erroneous start, one of these spacing elements be received after the receiver has been stopped.

When teletypewriter systems operating on the start-stop principle are controlled by means of conductors enclosed in cable, the number of abnormal conditions giving rise to false starts is kept to a minimum. When open wire lines are employed the number is greater. However, when the interconnection is through a radio link, due to atmospheric and other conditions, the number of false starts may be at times quite large. The present invention affords an arrangement wherein the start signal may be identified with great accuracy. While the arrangement of the invention is applicable to systems in which telegraph equipment is interconnected through cable or open wire lines it is contemplated that it will initially be most widely applied in radio telegraphy, particularly in radio telegraph links in which the ratio of signal level to noise level is low and in such systems in which the need of high accuracy in reception justifies the expense of the additional equipment required.

The present invention is intended primarily for application on a high speed radio telegraph system in which the intelligence is conveyed by signal combinations comprising permutations of signals of which the elements may be of either of two conditions such as signal or no-signal elements.

It will be seen from the foregoing description of the usual start-stop teletypewriter operation that the signal transition between the marking stop condition and the spacing start element performs the three functions of indicating the start of a new train, locating the first information element and setting the phase of the element sensing. The present invention achieves superior performance by separating these three functions with the use of a complex start or synchronizing combination.

In general the present invention essentially is a controlled gate in the radio telegraph receiving circuit giving access to a receiving oscillator which is tuned to oscillate at substantially the same frequency as that of the transmitting oscillator. The receiving oscillator is normally stopped, that is to say it is not oscillating. It is set into operation at the proper time and in the proper phase under control of the gate and then runs through as many cycles as there are signal elements following the start signal element in the transmitted train. The cycles of the receiving oscillator are counted while it is in operation. As the signal elements in the received train are received they are sensed at a particular phase of the oscillator cycle. The oscillator is automatically stopped when it has produced the required number of cycles.

The controlled gate is arranged to identify the proper instant of start and in turn to start the receiving oscillator. The gate has three controls, but before these may advantageously be described it is necessary to describe the characteristics of the transmitted signal trains which are specifically adapted to cooperate with the gate of the present invention to identify the proper start time.

In the start-stop system described in the foregoing there were but seven elements in each train and the very first element in each train was the start element. In the present arrangement, the single start signal element, which is used only to mark the beginning of the intelligence bearing signal elements of the train, is preceded by a special pattern of signal elements the function of which is to uniquely indicate that a new train is beginning and to accurately indicate the proper phase for the element sensing. This special pattern of signal elements comprises a fixed number of two-condition elements having a distinctive frequency, such as twice that of the frequency of the intelligence bearing signal elements. These signal elements of a distinctive frequency are followed by a predetermined interval during which a steady spacing signal is transmitted. This interval is followed immediately by the single marking start element.

Now it will be explained in a general way how the gate in the receiver with its three gate controls responds to the reception of the preliminary pattern followed by the start signal element to identify the start signal element. With respect to the first of the three gate controls, the fixed number of relatively high speed preliminary signal reversals, after being received by the radio receiver, are applied to the input thereof and passed through a filter which is arranged to pass a narrow band, 500 cycles for instance, centered at the frequency of the high speed reversals. This substantially delays the preliminary signal reversals. The output of the filter is applied to a pulsing circuit which responsively produces a negative pulse at each excursion of the output of the filter through zero in the negative direction. Because of the delay, these pulses persist during the interval of steady spacing and during the interval while the marking start signal element is being received. The interval of steady spacing and the phase of the pulses derived from the filter output are so arranged that one of the negative pulses from the output of the pulse circuit is produced at the time of reception of the center of the start pulse. This particular negative pulse as well as those preceding and following it are applied by the first gate control to the gate, and this particular negative pulse occurring at the center of the start element is critical and starts the oscillator in a manner to be explained.

The second of the three controls for the gate is a circuit branch, on which the preliminary pattern is impressed, comprising a filter which passes a wider band than the filter in the first gate control branch, and which does not interpose any substantial delay. The output of the filter is impressed on a rectifier and then on the gate. The output from the filter impressed on the rectifier produces a positive going wave that starts shortly after the first preliminary reversal signals are received and persists until just before the reception of the start element. The positive wave applied, from the second gate control, on the gate disables the gate until just before the start element is received.

The third control for the gate is a circuit branch through which the incoming signals are directly imposed on the gate. This third branch tends to enable the gate during all intervals while it is impressing a negative potential on the gate. The marking start signal element is a negative signal element of normal duration so the third control will tend to enable the gate throughout the interval while the start element is being received.

Considering the cooperative effect of the three gate controls, the second control maintains the gate locked by the rectified positive potential it impresses thereon until just before the arrival of the start element. The third control tends to enable the gate from the beginning to the end of the start element, and the first control is effective to open the gate for an instant which occurs just at the center of the start element and a sharp pulse is passed through the gate. This sharp pulse is employed to start the receiving oscillator which is started in proper phase and the oscillator thereafter times the sampling of the incoming intelligence bearing signal elements.

The foregoing may be better understood from a consideration of the following detailed description when read with reference to the associated drawings which taken together disclose a preferred embodiment in which the invention is presently incorporated. It is to be understood, however, that the invention may be incorporated in other embodiments which may be suggested to those skilled in the art by the present disclosure.

Figure 1:
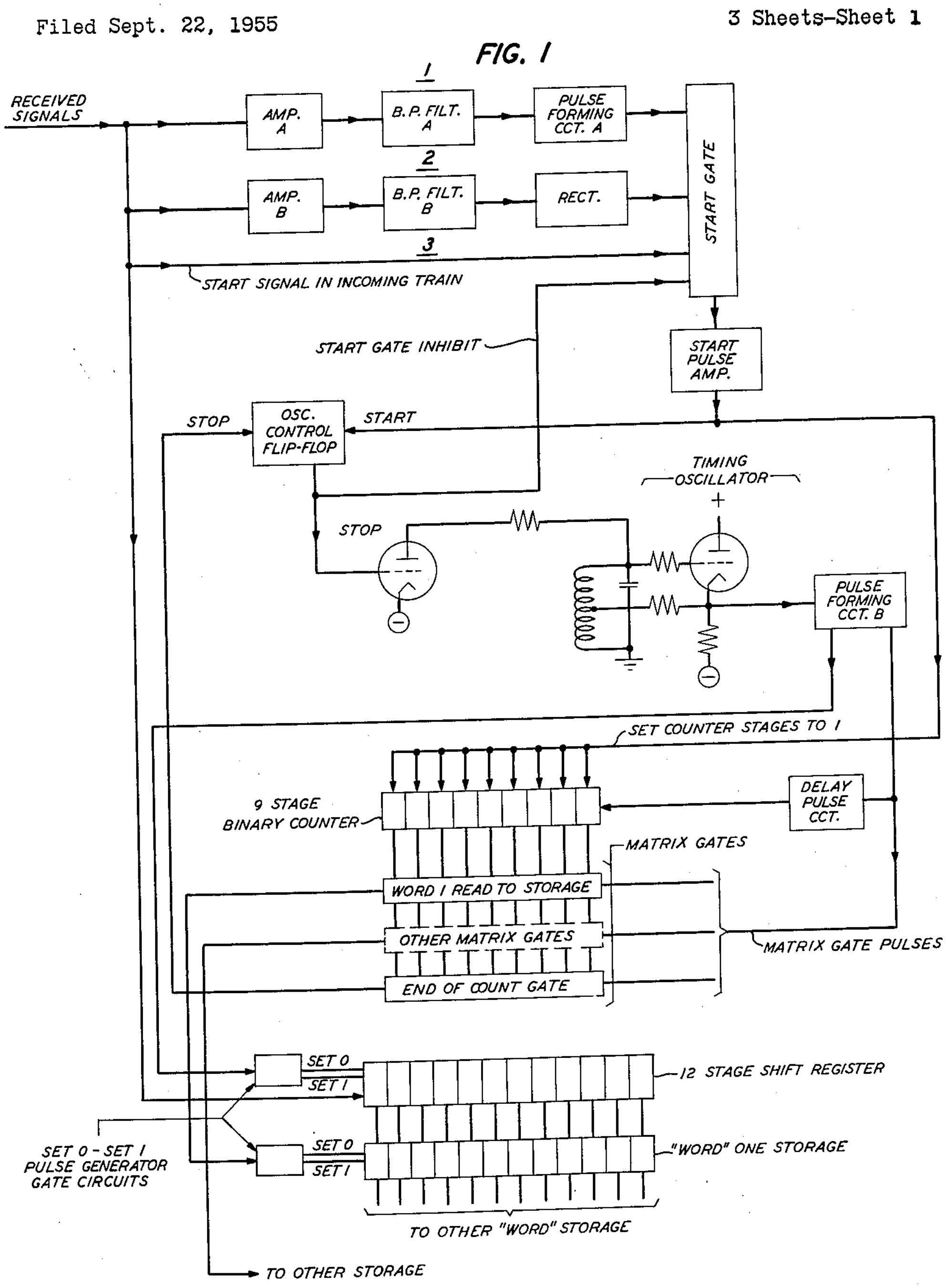
FIG. 1 is a diagram showing largely by means of captioned rectangles the relationship of the circuit components of the present system.

Refer now to FIG. 1. At the upper left in FIG. 1 is a conductor designated Received Signals. These are assumed to be incoming from the associated radio receiver, not shown. The received signals are impressed on the three control branches of the gate designated 1, 2 and 3 from top to bottom. The numbering corresponds to the numbering used in the general description in the foregoing. The pattern of the received synchronizing signals in each train, preceding the intelligence signals, is represented by the wave form designated A in FIG. 2. This wave form of the synchronizing pattern consists of 16 reversals at twice the regular signaling frequency followed by seven steady spacing intervals of normal duration and then by a single marking start element of normal duration. This number of reversals and steady signal elements has been found advantageous but, of course, is not limiting. After amplification in amplifier Amp A the signals are impressed on the narrow band-pass filter B.P. Filt A. This filter substantially delays the signals. Further, the filter minimizes the effect of noise. The wave form at the output of the filter which is impressed on the input of Pulse Forming circuit A is shown by wave form B in FIG. 2. It will be observed that the output is delayed and that it builds up slowly to a sinusoidal wave of full amplitude having the same frequency as the impressed square wave input signals. Further, it will be observed that the wave persists during the long spacing interval of the original signals and that it straddles the position of the single start element of the original signals.

When wave form B is impressed on pulse forming circuit A the output from the latter is as shown in wave form C. This is a series of narrow negative pulses one of which occurs each time wave B passes through zero of its negative excursion after wave B has built up. One, the critical one, of the narrow negative pulses of wave C occurs at the center of the start element of the original wave.

The synchronizing pattern when impressed on gate control branch 2 is amplified in amplifier Amp B and then passed through band-pass filter B.P. Filt B which passes a wider band than the filter in gate control branch 1 and interposes only a small delay. The output of the filter is rectified in rectifier Rect and impressed on the gate. The output of the rectifier is as shown in wave D, FIG. 2. This is a positive wave which rises to its full amplitude after the first half-dozen pulses of the original wave, is maintained at this level until about the end of reception of the double frequency reversals, and then declines to zero which is reached very shortly before the start element is due to arrive. While the positive output of the rectifier in branch 2 is applied to the gate, and until it falls to zero, the gate remains disabled.

All incoming signals including the synchronizing pattern with the start element are applied through branch 3 on the gate. Any negative condition of the incoming signal tends to enable it but cannot be effective while positive wave D persists, and unless there is simultaneously a negative pulse of wave C in branch 1. The start element, after positive wave D subsides to zero tends to enable the gate but the gate cannot pass a pulse until a narrow negative pulse of wave C arrives at the center of the start pulse. This narrow negative pulse is passed and is applied to the start pulse amplifier, Start Pulse Amp., and then is used to set an Oscillator Control Flip-Flop circuit to the start condition. The Timing Oscillator is normally stopped by the condition of the Stop triode which is normally conducting. The flip-flop circuit sets the Stop tube in the non-conducting condition, starting the Timing Oscillator in its zero voltage and maximum negative current condition. The Stop tube current, and the voltage and current wave forms of the Timing Oscillator are shown in wave form F in FIG. 2.

Figure 2:
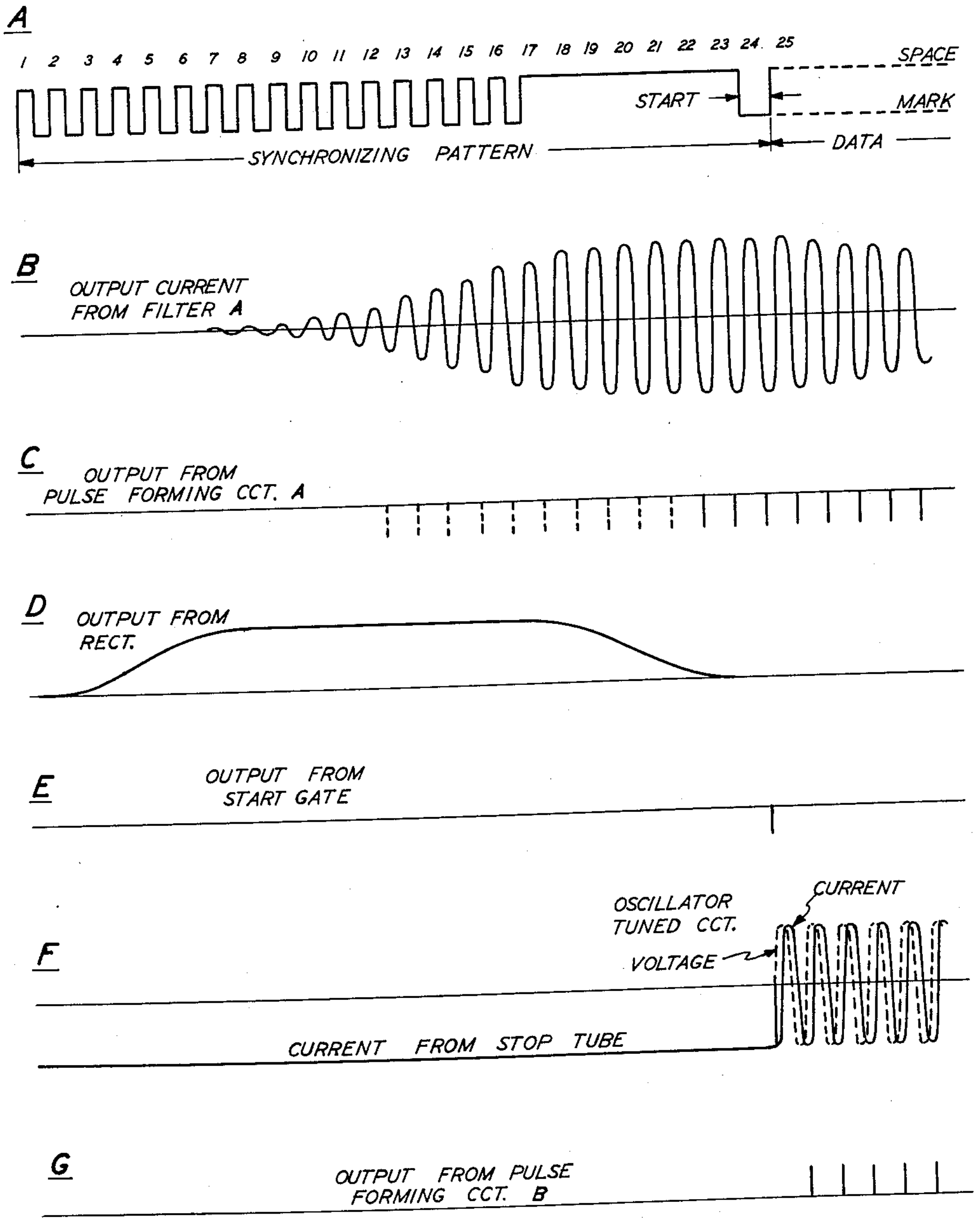
FIG. 2 shows a number of wave forms used in explaining the invention.

Reference to the wave forms of FIG. 2 and consideration of the foregoing description will inform that, after the synchronizing pattern and the start element have been received, since the wave of curve D no longer is available as an inhibiting factor at the Start Gate, and since the oscillations of wave B and the negative pulse of wave C persist after the end of reception of the start element and continue for a short time during the reception of the intelligence bearing signal elements, any negative signal element appearing among the first few signal elements of the intelligence bearing signals would again enable the gate and pass a pulse. This is prevented by connecting the Oscillator Control Flip-Flop to the Start Gate. With this Flip-Flop once triggered to the start condition the Start Gate is prevented from passing further pulses through the Start Gate until after the conditions described, which permit it, have ended.

Certain of the components of the system connected to the Start Gate will now be briefly described principally to make it apparent why it is necessary to prevent the passage through the gate of any signals following the signal which starts the Timing Oscillator.

The output of the Timing Oscillator is applied to Pulse Forming Circuit B which produces a narrow pulse each time the oscillator voltage passes through zero in a positive direction. These pulses are used to sample the intelligence bearing data digits throughout the complete message and are also used to recognize the binary count of a nine stage Binary Counter used in a program generator, which governs the time of performance of the various functions in each system cycle at the station. A Delay Pulse Circuit is interposed between the Pulse Forming Circuit B and the Binary Counter so as to prevent the count in the Binary Counter from changing until after the count has been sampled by the count recognizing gates, such as the End of Count Gate.

In FIG. 1 the End of Count Gate is enabled by a particular condition of all stages of the Binary Counter, which indicates that the end of the count for a cycle of the station system has been reached. At this time the pulse from the Pulse Forming Circuit B is passed through the End of Count Gate and applied to the Oscillator Control Flip-Flop to set the flip-flop to the stop condition. The flip-flop in turn causes the Stop tube to conduct and thus stop the Timing Oscillator. The Binary Counter is reset to the "all ones" condition by the amplified output of the Start Gate. It is important therefore that only a single signal be passed through the Start Gate during each cycle of operation of the system.

In one application of the invention, as shown in FIG. 1, in which "words" each having 12 signal elements follow the start signal element, without interruption or separation between them, the received signals, incoming in sequence are directed into a shift-register, identified in FIG. 1 as the 12-Stage Shift Register. Each of the 12-signal elements of each word enter the first or left-hand stage of the shift-register. After the first signal element is stored in the left-hand stage of the shift register, as each signal element of any train is received, the preceding signal elements are stepped to the right, one shift-register stage at a time, until the 12 stages of the register are filled with a permutation of 1 and 0 conditions defining the first "word." The shifting through the shift-register is under control of the Timing Oscillator and Pulse Forming Circuit B through a gate, the Set 0-Set 1 Pulse Generator Gate, which conditions the shift-register so that a 1 or a 0 signal element may be inserted in the first stage and propagated from stage to stage as required. The timing oscillator also controls a binary counter identified as the 9 Stage Binary Counter through the Delay Pulse Circuit. The binary counter counts the oscillator cycles and controls the shifting of the "words" into storage at proper counts by imposing conditions from each of its stages on a group of Matrix Gates. All of the elements of any of the "words" are shifted in parallel out of the shift register into a respective 12-element storage device under control of the Binary Counter and an individual Matrix Gate for each "word." Each Matrix Gate passes an individual "word" shift pulse at the proper count. Each of the 12-element storage devices has an individual Set 0-Set 1 Pulse Generator Gate Circuit responsive to the shift pulse from its respective Matrix Gate to condition each storage unit of a "word" storage device to receive a 1 or a 0 condition from the shift-register.

All of the stages of the Binary Counter are set to the "1's" condition in response to the amplified start pulse. In response to the first signal element of the first word, each Binary Counter stage is set to the 0 condition and counting begins. At the end of a receiving program the Binary Counter conditions the End of Count Gate to pass a pulse to the Oscillator Control Flip-Flop to stop the Timing Oscillator to end the receiving program.

It is particularly stressed that the receiving arrangement is shown by way of example only, to illustrate one form of receiver with which the synchronizing start circuit of the present invention may function. The start circuit may be employed with any form of signal pulse receiver and may be employed, for instance, to start any of the well-known teletypewriter receivers if conditions justify its use.

Figure 3:
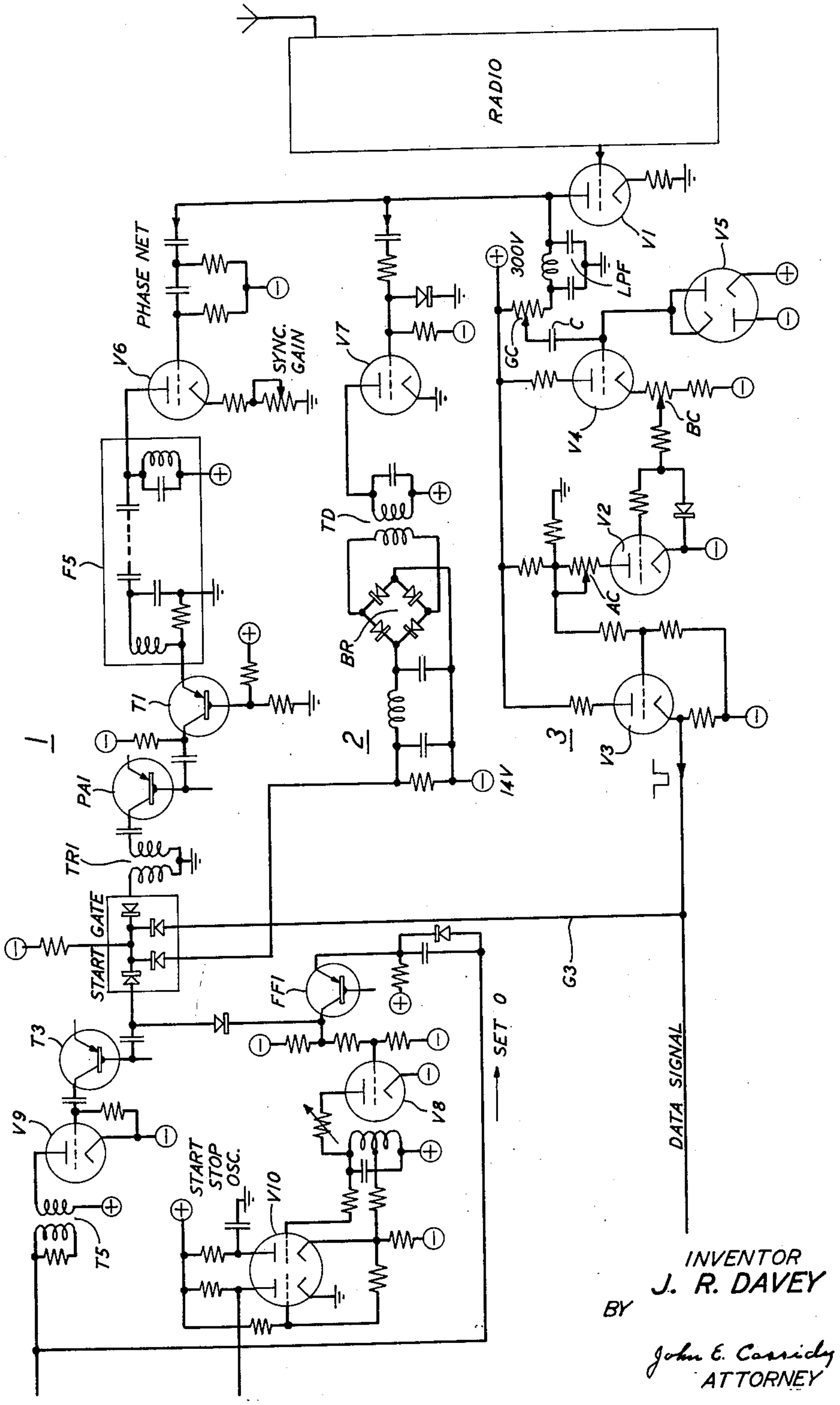
FIG. 3 is the detailed circuit of the invention.

For a detailed description of the operation of the circuit of the invention reference may be had to FIG. 3. In the following when the values of constants are cited, it is to be understood that they are cited by way of example and are not to be considered as limitations.

The incoming train of signals are received by a radio receiver shown at the right in FIG. 3. The incoming signal has a voltage swing of about 4 volts and is normally centered at plus 2 volts. It is amplified in amplifier V1. Connected in parallel to the plate of amplifier V1 are the three controls for the Start Gate. The three parallel branches numbered 1, 2 and 3 from the top down correspond to Start Gate control 1, 2 and 3 of FIG. 1. In the present instance parallel branch 3, which is the main input path for the incoming signals will first be described.

The incoming signal after amplification in tube V1 is passed through a low-pass filter LPF which attenuates the noise at frequencies above the fundamental signaling frequency, which may be 3350 cycles, for instance. The output of the low-pass filter is coupled through the gain control potentiometer GC and capacitor C to the grid of cathode follower V4. Definite direct-current voltage levels are established at this point by the suitably biased diodes of double diode tube V5. One diode conducts if the signal on the grid of tube V4 becomes more positive than +9 volts. The other diode conducts if the signal becomes more negative than −32 volts. When the diodes conduct, capacitor C changes its charge so as to keep the signal centered between these two direct-current potentials. The output of low-pass filter LPF is adjusted to have a swing of about 41 volts so that the diodes need only conduct to restore the proper direct-current potential levels to the signals. The output from cathode follower V4 is applied to tube V2 which responds to a narrow range of input voltage near −14 volts. The bias control BC is adjusted to center the large signal from tube V4 about this narrow range. The output of tube V2 is, of consequence, an approximate square wave corresponding to a narrow slice through the center of the signal from tube V4. The amplifier control AC provides adjustment of the swing of this squared wave so that the output as repeated by cathode follower V3 has direct-current values of about 0 volt for a "zero" and −14 volts for a "one." A low impedance direct-current voltage signal is thus obtained to feed the digital circuits over the conductor Data Signal and all of these signals are applied in parallel also through conductor G3 to the Start Gate.

The output from the anode of amplifier V1 is applied to gate control circuit 1 through the resistor capacitor network Phase Net which attenuates the signal and advances it in phase. The resulting signal is amplified in amplifier V6 and passed through narrow band-pass filter F5. This filter is centered on the frequency of the preliminary signals which it is assumed is twice the fundamental frequency. The filter is narrow enough so that it requires the entire 16 cycles of this signal before it reaches the steady state. The current in the output section of the filter passes through zero in the negative direction near the centers of the incoming digit intervals. This causes the emitter current of the transistor T1 to change from positive to negative and the collector voltage to swing sharply negative. This negative transient triggers pulse amplifier PA1 on the base. A negative pulse is thus obtained from transformer TR1 at the center of each incoming digit interval after the filter output has built up sufficiently. The base of the transistor T1 is biased positive so that the current output from the filter F5 must reach a certain value before any output from the collector is obtained. The gain of tube V6 is adjusted so no output from transistor T1 is obtained on noise in the absence of signal. Due to the delay through the filter F5 the series of pulses from transistor T1 bracket the position of the incoming start element.

Output from the plate of amplifier V1 in the coupling circuit is also amplified by the tube V7 and applied to the tuned detector TD. This circuit has a tuned transformer which responds to the 16 cycles of the ready signal. Connected to it there is a full wave bridge rectifier BR to provide a positive output voltage. This voltage builds up before the pulses from the transformer TR1 start and the voltage dies away before the pulses cease and just prior to the arirval of the single start element through conductor G3.

It can be seen from the foregoing that the Start Gate has three inputs: (1) the negative pulses from transformer TR1 (2) the positive rectified wave from the tuned detector and (3) the incoming data signals. The Start Gate produces a negative output pulse only after the positive rectifier wave has died away and when the output from the other two branches are each at their negative excursions. Normally, this condition first occurs at the center of the incoming negative single start element. The output of the tuned detector inhibits the Start Gate until just before the arrival of the incoming start element. This helps to guard against a false early start due to noise or due to mistaking one of the preliminary signals for the start element.

The recognition of the start element as described above causes the receive program to start. The output of the State Gate triggers pulse amplifier T3 which in turn drives the start pulse amplifier V9. The resulting negative pulse from transformer T5 sets all stages of the receiving binary counter, not shown, to 1 and triggers monostable transistor flip-flop FF1 to the zero condition. The negative collector swing of flip-flop FF1 cuts off stop tube V8 and interrupts the start current flowing in the tuned circuit of the start-stop oscillator. This causes the oscillator circuit, which is associated with the right half of twin triode V10, to start with the voltage at the cathode in the zero degrees phase of a sine wave. The left-hand half of tube V10 serves to limit the oscillator wave to a trapezoidal form which has its negative going transient at the centers of the incoming digit intervals.

The Start Gate shown in FIG. 3 is a diode gate circuit, comprising a plurality of diodes poled in such manner, one with respect to the other, that no signal is passed through the gate while the potential of any of the three input control branches is positive. The diode connected between the output of the Start Gate and the collector of the oscillator control flip-flop FF1 prevents further triggering of amplifier T3 once the oscillator has been started. Diode gates are described in Patent No. 2,535,-303 granted to W. D. Lewis, December 26, 1950, and Patent No. 2,673,936, granted to J. R. Harris, March 30, 1954, which are hereby incorporated by reference as though fully set forth herein. Transistor amplifier circuits and trigger circuits are well known in the art and are described in Patent No. 2,524,035, granted to J. Bardeen and W. H. Brattain, October 3, 1950, and in Patent No. 2,579,336, granted to A. J. Rach, December 18, 1951, respectively, which are hereby incorporated herein by reference as though fully set forth herein.

What is claimed is:

1. A receiving synchronizing circuit for a start-stop telegraph signal train, said train comprising a preliminary group of signal elements terminated by a start signal element, said start signal element followed by intelligence bearing signal elements, said preliminary group having a higher pulse repetition rate than that of said intelligence bearing signal elements, said circuit comprising a timing oscillator, a gate for controlling said oscillator, a first, second and third branch for controlling said gate, a common input for said train to said branches, means in one of said branches responsive to said train, for disabling said gate until the arrival of said start signal element, said means comprising a narrow band pass filter tuned to the frequency of said preliminary signals connected through a full wave rectifier to said gate, so as to disable said gate before said start signal arrives, and means in said gate responsive to the impressing thereon of said start signal element for starting said oscillator.

2. In a telegraph receiver, a synchronizing start signal circuit having means therein for selecting a start signal element in a signal train, said signal train having a preliminary group of alerting signals followed by said start signal element and then by intelligence bearing signal elements, said alerting signals having double the pulse repetition rate of said intelligence bearing elements, said start circuit having selecting means for receiving said alerting signals, said selecting means comprising an input circuit connected to a plurality of parallel receiving branches, one of said branches having a first narrow band filter connected to a pulsing circuit for producing delayed pulses at said double pulse repetition rate, another of said branches having a second filter having a wider band than said first filter and a rectifier connected to the output of said second filter, said selecting means comprising also a gate, said gate connected to said pulsing circuit and said rectifier, to cooperatively control said gate, to identify said start signal.

3. In a telegraph system, a telegraph receiver having filtering means therein for selectively receiving a preliminary group of phasing signal elements preceding the start signal element and the intelligence bearing signal elements of a start-stop train, said preliminary group having a pulse repetition rate double that of said other elements, said filter having means for averaging the phasing of said preliminary group of elements, to minimize phasing errors in individual elements, a timer for timing said intelligence elements in said train responsive to said filter and means for controlling the phase of said timer, with relation to said intelligence bearing signal elements, through the output of said filter.

4. A receiving synchronizing circuit for a start-stop telegraph system, said circuit having instrumentalities for receiving a start-stop signal train comprising a preliminary group of signal elements terminated by a start signal element, said start signal element followed by intelligence bearing signal elements, means, comprising a gate and a first, second and third gate control branch connected to said gate for impressing said preliminary group and said start signal element through said first, second and third branches on said gate, means in said gate responsive to signals applied from said gate control branches for preventing the passage through said gate of any signal element before said start signal element, means in said gate responsive to signals applied from said gate control branches for passing a signal pulse through said gate during the reception of said start signal element, a timing oscillator connected to said gate and means responsive to the passing of said signal pulse through said gate for starting said oscillator.

5. A timing oscillator for timing the reception of intelligence bearing signal elements in signal trains in a start-stop telegraph system, each of said trains comprising a preliminary group of alerting signal elements followed by a start signal element and then by said intelligence bearing signal elements, a synchronizing circuit for said oscillator, said circuit comprising a diode gate circuit and a first and a second control branch connected to said gate for controlling said gate, means in said first branch, responsive to the reception of said preliminary elements of a signal train, for disabling said gate until shortly before the arrival of said start-signal element following said preliminary signal elements, means in said second branch for impressing a short critical pulse to said gate at a point in time corresponding to the midpoint of said received start signal element, and means responsive to the production of said pulse for starting said oscillator to time the remainder of said train.

6. A synchronizing circuit for a start-stop telegraph system comprising means for receiving a signal train comprising a sequence of square waves followed by a spacing signal and a single start signal, a normally disabled gating circuit having three inputs, a first control connection including a filtering and rectifying network between said receiving means and said gating circuit for impressing an output wave of a first polarity to the first of said inputs of said gating circuit in response to said square waves, a second control connection including a filter, a delay network and a pulsing circuit between said receiving means and said gating circuit for impressing a series of pulses of a polarity opposite to said first polarity, to the second of said inputs of said gating circuit in response to said square waves, and, a third control connection including a conversion network between said receiving means and said gating circuit for impressing said signal train to the third of said inputs of said gating circuit, said gating circuit adapted to be enabled at that instant after the termination of said wave of said first polarity when there is a coincidence of potential conditions of said opposite polarity at the outputs of said second and third inputs.

7. A circuit in accordance with claim 6 in which there is additionally provided a bistable element having a first and a second condition, a control connection between an output terminal of said gating circuit and the input terminal of said bistable element for driving said bistable element to its first condition when said gating circuit is enabled, a locking connection between the output of said bistable element and another input terminal of said gate for disabling said gate when said bistable element is in its second condition.

8. A circuit in accordance with claim 7 in which there is additionally provided a normally nonconducting timing oscillator, a control connection between said output of said bistable element and the input of said timing oscillator for rendering said oscillator conductive when said bistable element is in its first condition.

9. A synchronizing circuit for a start-stop telegraph system comprising means for receiving a signal train sequence composed of a series of square wave signals a spacing signal and a single square wave signal, a normally disabled gating circuit, a first control connection including a filtering and rectifying network between said receiving means and said gating circuit for impressing on the input terminal of said gating circuit a positive going wave beginning approximately at the time a sequence is received and decaying to zero at a time just before the single square wave of said sequence is received, a second control connection including a filtering delay network and an impulse producing circuit between said receiving means and said gating circuit for impressing on the input terminal of said gating circuit a series of negative pulses occurring in time coincidentally with the midpoints of each of the waves of said square wave series and continuing in this time sequence after said series of square waves is completed, and a third control connection including a conversion network between said receiving means and said gating circuit for impressing said signal train on an input terminal of said gating circuit, said gating circuit being energizable by the first simultaneous existence of negative pulses at the outputs of said second and third control connections after the positive output wave from said first control connection has decayed to zero.

10. In a start-stop telegraph system, a telegraph receiver having means therein for receiving a train of start-stop telegraph signal elements, said train comprising a first group of preliminary signal elements for alerting and phasing said receiver with respect to the phase of start signal element and intelligence bearing signal elements following later in said train, said preliminary signal elements having a pulse repetition rate of $f1$, in cycles per second, said start signal element and said intelligence bearing signal elements having a pulse repetition rate of $f2$, one-half of that of $f1$, in cycles per second, said preliminary signal elements separated in time from said start signal element by an interval equal in duration to an integral number, greater than one, of said signal elements of said pulse repetition rate of $f2$, said means comprising an input circuit connected through signal phasing means, for changing the phase of said preliminary signal elements, delay means responsive to said phasing means and pulsing means responsive to said delay means, for producing pulses at said repetition rate $f1$ which straddle said start signal element, so that a critical one is produced at about the middle of said start signal element, a timing oscillator for controlling the reception of said intelligence bearing elements and means, responsive to said critical pulse, for starting said oscillator.

References Cited in the file of this patent

UNITED STATES PATENTS

| | | |
|---|---|---|
| 2,435,035 | Devaux | Jan. 27, 1948 |
| 2,522,609 | Gloess | Sept. 19, 1950 |
| 2,582,218 | Salyton | Jan. 15, 1952 |
| 2,589,130 | Potter | Mar. 11, 1952 |
| 2,642,493 | Locke | June 16, 1953 |